(12) United States Patent
Heid et al.

(10) Patent No.: US 8,584,624 B2
(45) Date of Patent: Nov. 19, 2013

(54) EQUINE SUPPORT BOOT

(75) Inventors: Ward Heid, Alvarado, TX (US); Kirby A. Smith, Fort Worth, TX (US); Stephen W. Coder, Godley, TX (US)

(73) Assignee: Western Legacy Sales, LLC, Alvarado, TX (US)

( * ) Notice: Subject to any disclaimer, the term of this patent is extended or adjusted under 35 U.S.C. 154(b) by 1075 days.

(21) Appl. No.: 12/537,103

(22) Filed: Aug. 6, 2009

(65) Prior Publication Data
US 2009/0288377 A1 Nov. 26, 2009

Related U.S. Application Data

(63) Continuation-in-part of application No. 12/298,256, filed as application No. PCT/US2007/004880 on Feb. 26, 2007, now Pat. No. 8,443,763.

(51) Int. Cl.
*A01K 13/00* (2006.01)
*B68C 5/00* (2006.01)

(52) U.S. Cl.
USPC ............................................. 119/856; 54/82

(58) Field of Classification Search
USPC ................................ 54/82; 119/856, 863, 860
See application file for complete search history.

(56) References Cited

U.S. PATENT DOCUMENTS

| 1,417,742 | A |  | 5/1922 | Keller |
| 1,899,471 | A |  | 2/1933 | Meyer |
| 2,194,921 | A |  | 3/1940 | Wagner |
| 2,246,100 | A |  | 6/1941 | Marzani |
| 2,449,410 | A |  | 9/1948 | Polinsky |
| 2,512,925 | A |  | 6/1950 | Eggeman |
| 3,124,919 | A |  | 3/1964 | Thompson |
| 3,209,517 | A |  | 10/1965 | Hyman |
| 5,107,827 | A |  | 4/1992 | Boyd |
| 5,115,627 | A | * | 5/1992 | Scott ................. 54/82 |
| D329,108 | S |  | 9/1992 | Boyd |
| 5,363,632 | A | * | 11/1994 | Armato .............. 54/82 |
| 5,579,627 | A | * | 12/1996 | Vogt ................... 54/82 |
| 5,816,032 | A | * | 10/1998 | Vogt ................... 54/82 |
| 5,871,458 | A | * | 2/1999 | Detty ................. 602/27 |
| 5,910,126 | A |  | 6/1999 | Wilson et al. |
| 5,926,843 | A |  | 7/1999 | Winchester |
| 6,151,873 | A |  | 11/2000 | Rogers |
| 6,918,236 | B2 |  | 7/2005 | Springs |
| 2004/0031246 | A1 | * | 2/2004 | Springs .............. 54/82 |

OTHER PUBLICATIONS

Notice of Allowance issued by the Canadian Intellectual Property Office from corresponding Canadian Patent Application No. 2,682,683; mailed Feb. 3, 2012.
Canadian Office Action from counterpart CA Application No. 2,680,985 issued by the Canadian Intellectual Property Office on Mar. 9, 2011.

(Continued)

*Primary Examiner* — Son T Nguyen
(74) *Attorney, Agent, or Firm* — James E. Walton; J. Oliver Williams

(57) ABSTRACT

An equine support boot comprises a base portion, at least one upper strap, a concave portion formed in the base portion, an orthopedic pad disposed in the concave portion, and at least one sling strap connected to the base portion, the sling strap being configured to apply an upward force on the concave portion.

12 Claims, 8 Drawing Sheets

(56) References Cited

OTHER PUBLICATIONS

Canadian Office Action from counterpart CA Application No. 2,682,683 issued by the Canadian Intellectual Property Office on Mar. 8, 2011.
International Search Report from corresponding PCT application No. PCT/US 07/04880 dated Nov. 28, 2007.
International Preliminary Report on Patentability from corresponding PCT application No. PCT/US 07/04880 dated Sep. 3, 2009.
Non-Final Office Action from counterpart U.S. Appl. No. 12/298,256, mailed Jan. 21, 2011.
Final Office Action from counterpart U.S. Appl. No. 12/298,256, mailed Jul. 22, 2011.
Non-Final Office Action from counterpart U.S. Appl. No. 12/298,256, mailed Dec. 22, 2011.
Restriction Requirement from counterpart U.S. Appl. No. 12/298,256, mailed Dec. 15, 2010.

\* cited by examiner

EQUINE SUPPORT BOOT

This application is a continuation-in-part of U.S. patent application Ser. No. 12/298,256, filed 23 Oct. 2008, which claims the benefit of International Application No. PCT/US07/04880 filed 26 Feb. 2007.

BACKGROUND

1. Field of the Invention

The present invention relates to equine support boots. In particular, the present invention relates to support boots for the lower limbs of horses.

2. Description of Related Art

For centuries, the bond between man and horse has been a strong one. At times in history, the survival of people would not have been possible without horses. Today, although most people are no longer dependent upon horses, the livelihoods of many people are still dependent upon access to strong, healthy horses. Indeed, the equine industry has never been stronger. Every day, around the world, thousands of horses are bought, sold, and traded for a wide variety of uses. Some are race horses, some are show horses, and some simply work day in and day out on farms and ranches throughout the world. Regardless of how they are used, horses must be cared for and maintained if they are to continue to be healthy, strong, and valuable.

Each year, vast sums are money are spent on the health and maintenance of horses. Hundreds of millions of dollars are spent on tools, tack, equipment, gear, supplies, accessories, training, and veterinary services to ensure that horses remain healthy and fit. Not only are horses treated after they have become injured, but significant resources are expended to prevent injuries from ever occurring. In recent years, the emphasis on prevention of injuries to horses has increased dramatically. Significant strides have been made in the areas of medicine, education, training, and equipment to help reduce the types and numbers of injuries sustained by horses.

One area of the equine industry that has seen tremendous growth is protective wear for horses' legs. These days, a myriad of products are available to protect a horse's legs from injury, including many different types of ankle boots, skid boots, splint boots, knee boots, support boots, and leg wraps. These products often offer new designs and incorporate new materials. Unfortunately, some of these products perform their advertised and intended purposes, and some do not. For example, some boots are advertised as support boots, but provide little or no support whatsoever.

Thus, although the foregoing products and methods represent great strides in the area of equine support boots, many shortcomings remain.

DESCRIPTION OF THE DRAWINGS

The novel features believed characteristic of the equine support boot of the present application are set forth in the appended claims. The equine support boot of the present application itself, however, as well as a preferred mode of use and further objectives and advantages thereof, will best be understood by reference to the following detailed description of an illustrative embodiment when read in conjunction with the accompanying drawings, wherein:

DETAILED DESCRIPTION

The equine support boot of the present disclosure provides support to the fetlock joint and the bones, tendons, and ligaments, and other structures associated with the fetlock joint. The support boot restricts and selectively controls the movement of the fetlock joint. The support boot may be used as an injury prevention device and/or as a therapeutic device for horses that have already been injured. For horses that have already been injured, the support boot provides stability in the rehabilitation process, which allows the horse to react better to treatment. Use of the support boot during rehabilitation of a lame horse can reduce the overall time required to rehabilitate the horse.

The support boot may be utilized in a wide variety of configurations. Although the support boot is described herein with respect to an orthopedic device, the support boot may have different configurations. For example, in some instances the support boot may be configured for use as a skid boot to add cushioning between a horse's fetlock joint and the ground. In other implementations, the support boot may be configured as a splint boot to add support, cushioning, and protection from crossover injuries.

When applied, the support boot may extend from the proximal cannon bone to the distal pastern. The support boot may cover and protect areas proximal to the fetlock joint, and provide support to the flexor tendons and suspensory ligament by decreasing the palmar/plantar movement, i.e., "bowing," of these structures during load-bearing. The area of coverage and the materials used in the construction of the support boot and its component parts may also provide protection from blunt force injuries, such as over-reach, interference, run-down injuries, as well as others.

In some implementations, the support boot may also provide additional load-bearing support by the incorporation of a force-resistant orthopedic pad disposed below the level of the fetlock. When the support boot is applied to a horse's lower leg, the orthopedic pad fits snuggly between the palmar/plantar aspect of the proximal pastern and the ventral portion of the seasmoids, i.e., the rear, bottom portion of the fetlock. This added support and control decreases the extension of the fetlock joint, thereby decreasing the tensile stress that can occur in the suspensory ligament and the flexor tendons during load-bearing.

Figure 1:
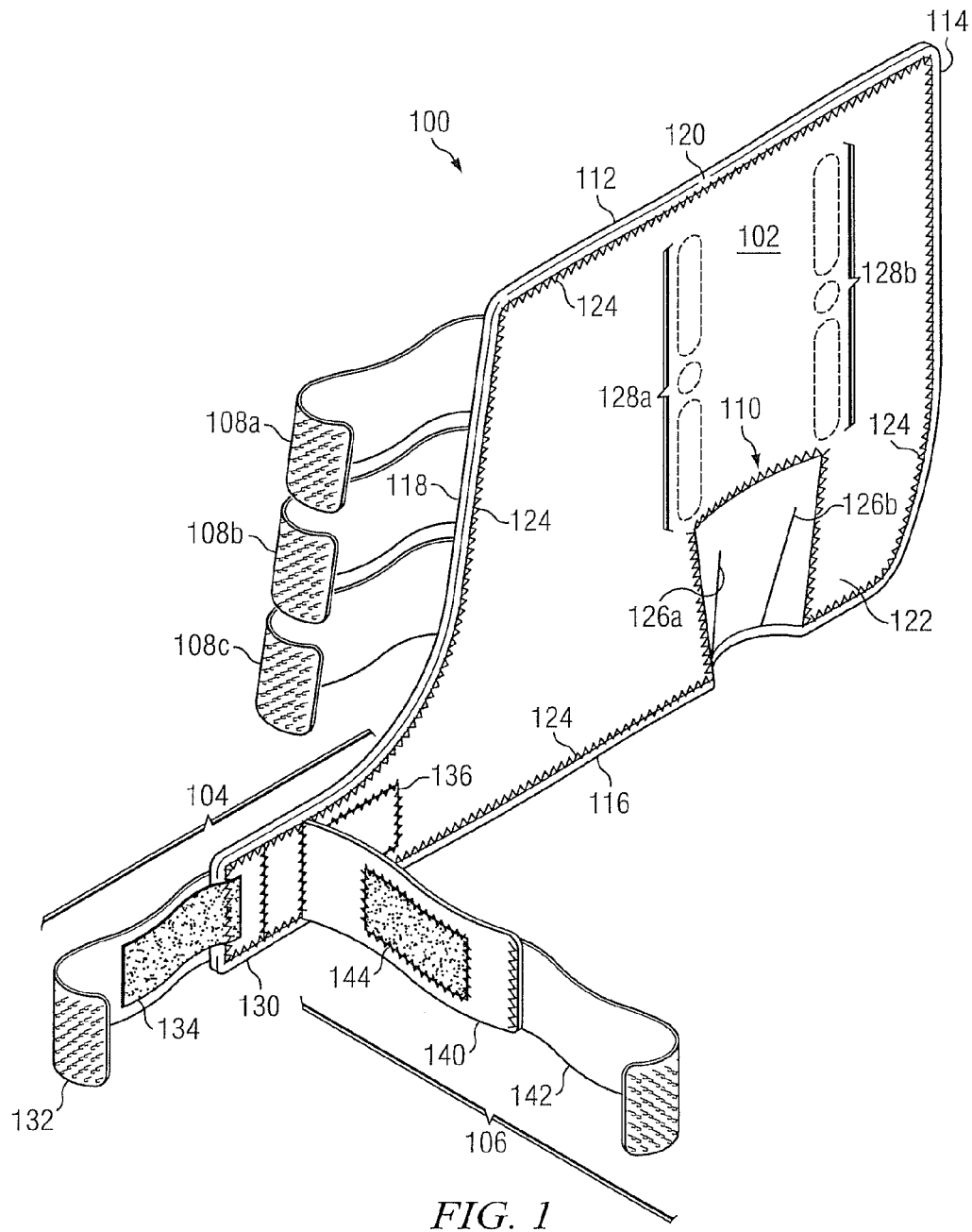
FIG. 1 is a perspective view of an example equine support boot.

FIG. 1 illustrates an example implementation of an equine support boot 100. The support boot 100 may include a base portion 102, a first sling strap 104, a second sling strap 106, one or more upper straps 108a, 108b, and 108c, a concave portion 110, and an orthopedic pad 200 (see also FIGS. 5 and 6A-6D). In some instances, the base portion 102 may include a top edge 112, a rear edge 114, a bottom edge 116, and a front edge 118. The base portion 102 may be formed by one or more layers of compliant materials. For example, in some implementations, the base portion 102 may be formed from an inner neoprene layer 120 that is bonded on an exterior surface to an outer loop fabric layer 122. In some instances, the loop fabric layer 122 may be formed from or include an unbroken loop fabric. Also, in some implementations, a thin knit fabric may be secured to the interior surface of neoprene layer 120. The thin knit fabric may be operable to protect and enhance the performance of neoprene layer 120. In some instance, the loop fabric layer 122 may form a loop portion of a hook and loop type bond between the first sling strap 104 and the base portion 102, and between the second sling strap 106 and the base portion 102, as explained in more detail herein.

In some implementations, one or more portions of the support boot 100 may be constructed with stitching. For example, in some instances, stitching 124 may be utilized along the edges 112, 114, 116, and 118 to prevent the neoprene layer 120, the thin knit fabric, and loop fabric layer 122 from delaminating. The upper straps 108a, 108b, and 108c may be adjustable so that the upper portion of support boot 100 can be snuggly and securely wrapped around the horse's lower leg above the fetlock joint. The concave portion 110 may be formed in or adjacent to bottom edge 116. In some instances, the concave portion 110 may be shaped by at least one pleat, such as pleats 126a and 126b, formed in base portion 102. The bottom edge 116 may curve upwardly adjacent concave portion 110, and may also curve upwardly near first sling strap 104 to aid in providing a snug fit around the horse's leg. Further, in some instances, the support wedge 200 may be disposed in the interior region of concave portion 110.

The exterior surface of the base portion 102 at the concave portion 110 may optionally be coated, treated, or overlaid with a tough, durable material to prevent damage to the base portion 102. For example, materials such as nylon, Kevlar, rubber, plastic, or other suitable materials may be applied to the base portion 102 at the concave portion 110 for this purpose. Application of such a material may be particularly useful in instances in which the support boot 100 is adapted for use as a skid boot. It will be appreciated that such treatment or addition to the concave portion 110 may be integral with concave portion, may be bonded to the concave portion 110, or may be releasably coupled to the concave portion 110.

The base portion 102 may also include one or more optional tendon support members, such as tendon support members 128a and 128b. In some implementations, the tendon support members 128a and 128b may be semi-rigid, compliant structures that extend inwardly from the base portion 102 and are configured and arranged to engage the tendon grooves of the horse's lower leg. When the support boot 102 is applied to the lower leg of a horse, the tendon support members 128a and 128b provide lateral support and stabilization to the flexor tendons, the suspensory ligament, the sesamoidean ligaments, the sesamoid bones, and other tendons, ligaments, and bones in the area of the fetlock joint and lower pastern. In addition, the tendon support members 128a and 128b ensure that the support boot 100 is properly aligned during application to the horse's lower leg, and prevent rotation of the support boot 100 about the horse's leg during operation.

The tendon support members 128a and 128b may be implemented in a wide variety of materials, shapes, and sizes. For example, the tendon support members 128a and 128b may be integral with and formed of the same material as base portion 102. Alternately, the tendon support members 128a and 128b may be formed of a different material, such as nylon, leather, rubber, plastic, or other suitable material. Further, the tendon support members 128a and 128b may be coated or treated with other compliant materials.

In instances in which the tendon support members 128a and 128b are formed from alternative materials, the tendon support members 128a and 128b may be bonded to the base portion 102 or secured into slots, pouches, or pockets in the base material 102. In other implementations, the tendon support members 128a and 128b may be removably placed into slots, pouches, or pockets, permitting the selective use of the tendon support members on a case-by-case basis. As shown in FIG. 1, the tendon support members 128a and 128b may form elongated ribs. Alternately, the tendon support members 128a and 128b may form circular buttons, oval ridges, and/or other shapes, either alone or in combination with each other. In addition, the tendon support members 128a and 128b may have custom configurations of shapes and materials that are selectively tailored for particular maladies, applications, or individual horses.

The support boot 100 may also include a splint pad (not shown). The addition of the splint pad allows the support boot 100 to function also as a splint boot. In some instances, the splint pad may be formed from an additional layer or layers of padding in a generally upright configuration. Further, the splint pad may be wider than tendon support members 128a or 128b and provide support, cushioning, and protection from crossover injuries. A support boot 100 that includes the splint pad may or may not include the second sling strap 106.

Referring again to FIG. 1, the first sling strap 104 may include an extension portion 130, a first connector portion 132, a first receiver portion 134, and a second connector portion 136. In some implementations, the extension portion 130 may form an elongated extension of the base portion 102 and extend outward from a corner formed by the intersection of the bottom edge 116 and the front edge 118. The first connector portion 132 may be attached to the extension portion 130. For example, in some instances, the first connector portion 132 may be attached to the extension portion 130 with stitches. In some instances, the first connector portion 132 may be formed from hook-type fabric and may function as the hook portion of a hook and loop type bond between the first sling strap 104 and the base portion 102. Also, in some implementations, the first receiver portion 134 may be formed from a loop-type fabric and function as a portion of a loop portion of a hook and loop type bond between the second sling strap 106 and the base portion 102. The first receiver portion 134 may be stitched or otherwise attached to the exterior surface of connector portion 132 and, as shown in FIG. 1, may also extend over onto a portion of the exterior surface of the extension portion 130. The second connector portion 136 may be stitched or otherwise attached to the interior surface of extension portion 130 and function as a hook portion of a hook and loop type bond between the first sling strap 104 and the base portion 102 between the pleats 126a and 126b.

The second sling strap 106 may include a tab portion 140, a third connector portion 142, and a fourth connector portion 144. In some instances, the tab portion 140 may be formed from the same material as the base portion 102 and may be attached to the extension portion 130 of the first sling strap 104 by stitching. In other implementations, the tab portion 140 may be formed from a material different than the base portion 102. The third connector portion 142 may be attached to the tab portion 140. For example, the third connector portion 142 may be attached to the tab portion 104 by stitching. The third connector portion 142 may be formed from hook-type fabric and function as a hook portion of a hook and loop type bond between the second sling strap 104 and the combination of the base portion 102 and the first receiver portion 134. In some implementations, the fourth connector portion 144 may be stitched or otherwise bonded to the interior surface of tab portion 140. The fourth connector portion 144 may be formed from hook-type fabric and function as a hook portion of a hook and loop type bond between second the sling strap 106 and the extension portion 130. In some instances, the fourth connector portion 144 may be aligned with the second connector portion 136 during installation of the support boot 100 onto the horse's leg.

FIGS. 2-5 show various views of the support boot 100 installed around the fetlock joint and lower leg of a horse. As shown, the support boot 100 extends from the proximal cannon bone to the distal pastern. According to some implementations, many of the components of the support boot 100 may be constructed from compliant materials that, when stretched and applied to a horse's lower leg, provide the support boot 100 with a strong and rigid support structure. This feature allows the support boot 100 to cover and protect the areas proximal to the horse's fetlock joint, and provides support to the flexor tendons and suspensory ligament by decreasing the palmar/plantar movement, i.e., "bowing," of these structures during load-bearing. In addition, because the support boot 100 may be formed, at least in part, from generally padded, compliant materials, the configuration and construction of the support boot 100 can provide protection from blunt force injuries, such as over-reach, interference, run-down injuries, and others.

Figure 4:
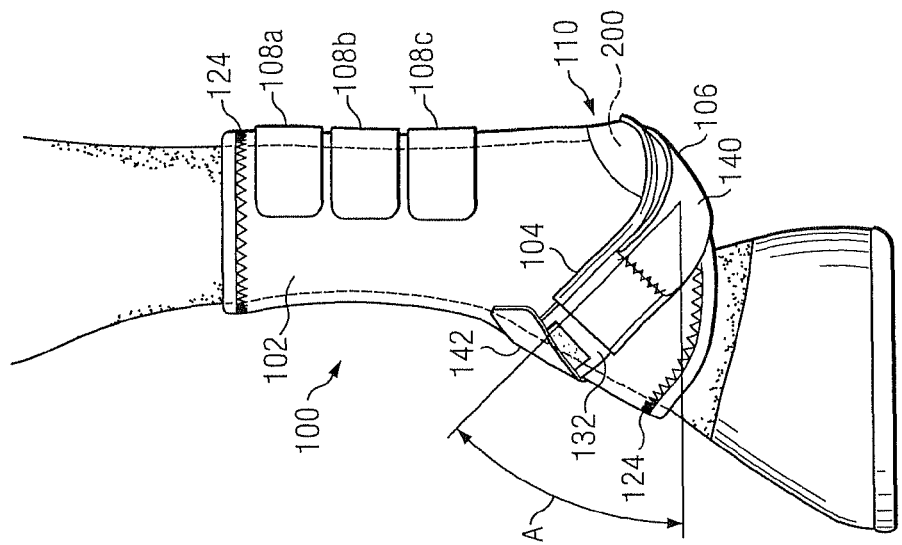
FIG. 4 is a left side view of the equine support boot of FIG. 1 installed onto the lower leg of a horse.
Figure 3:
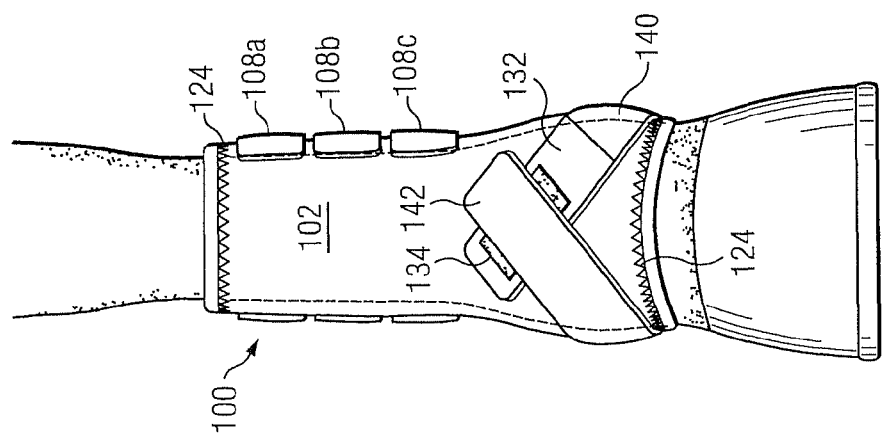
FIG. 3 is a front view of the equine support boot of FIG. 1 installed onto the lower leg of a horse.
Figure 2:
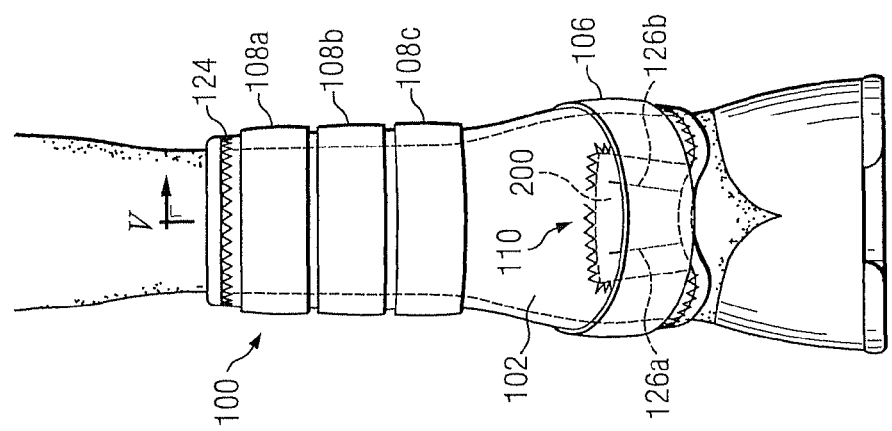
FIG. 2 is a rear view of the equine support boot of FIG. 1 installed onto the lower leg of a horse.
Figure 5:
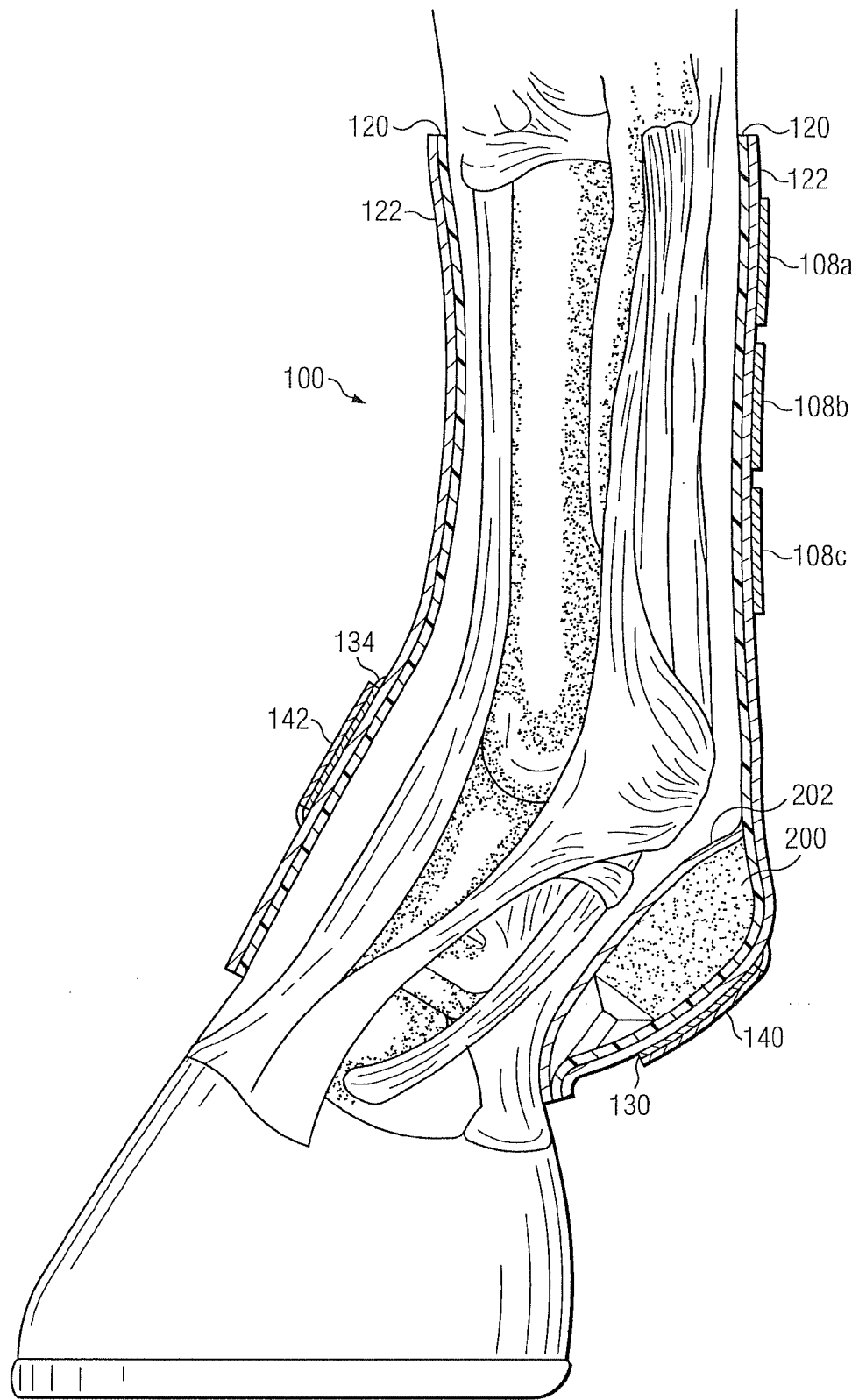
FIG. 5 is a longitudinal cross-sectional view of the equine support boot of FIG. 1 taken at V-V of FIG. 2 with a portion of the horse's lower leg included to illustrate the general alignment of the support boot.

As shown in FIGS. 2, 4, and 5, the orthopedic pad 200 may be included with some implementations of the support boot 100. When included, the orthopedic pad 200 fits snuggly between the palmar/plantar aspect of the proximal pastern and the ventral portion of the sesamoid bones, i.e., the bottom, rear portion of the fetlock joint. This added support restricts the extension of the fetlock joint, thereby decreasing the tensile stress that can occur in the suspensory ligament and the flexor tendons during load-bearing. In FIG. 3, a cross-over attachment configuration of the first sling strap 104 and the second sling strap 106 is shown. This dual sling-strap configuration provides upward forces that pull upward on the lower area of concave portion 110 and orthopedic pad 200. In some instances, the upward forces provided by the dual sling-strap can be considerable. This configuration provides additional resistance to extension of the fetlock joint.

FIG. 4 shows the relative location of orthopedic pad 200 and the upward support of the first sling strap 104 and the second sling strap 106 according to some implementations of the support boot 100. As shown, first connector portion 132 of the first sling strap 104 and the tab portion 140 of the second sling strap 106 form an angle A with respect to concave portion 110. According to some implementations, the angle A is approximately 45°. However, in other implementations, the angle A may be larger or smaller than 45°. Thus, it will be appreciated that angle A may vary considerably depending on the application in which support boot 100 is used and is not, therefore, limited to 45°.

FIG. 5 is a longitudinal cross-sectional view of the support boot 100 taken at V-V of FIG. 2 with a portion of the horse's lower leg included to illustrate the general alignment of the support boot 100. As illustrated, the orthopedic pad 200 is disposed in the concave portion 110. According to some implementations, the orthopedic pad 200 may be disposed in the concave portion 100 and sandwiched between an interior surface of the base portion 102 and an interior patch 202. In some instances, the interior patch 202 may be formed from a layer of neoprene with a knit fabric bonded to an interior surface of the neoprene. An exterior surface of interior patch 202 may be bonded to the interior surface of orthopedic pad 200. The interior patch 202 may be operable to prevent orthopedic pad 200 from being worn or damaged by movement of the horse's fetlock joint. The interior patch 202 may be attached to the base portion 102. For example, in some instances, the interior patch 202 may be bonded and/or stitched to the base portion 102. Further, the interior patch 202 may include suitable edge treating to add durability and comfort to the horse's leg. The orthopedic pad 200 may undergo some deformation during assembly of support boot 100 and may undergo additional deformation during application onto the horse's leg. This deformation, illustrated in FIG. 5, allows the orthopedic pad 200 to better conform to the palmar/plantar aspect of the proximal pastern and the ventral portion of the sesamoid bones. According to some implementations, the orthopedic pad 200 may be a relatively thick member, i.e., several times thicker than first sling strap 104 or second sling strap 106. In other implementations, the orthopedic pad 200 may have a different thickness, i.e., be thicker or thinner, which may vary according to particular maladies, applications, and/or individual horses. The thickness of the orthopedic pad 200 can ensure that the fetlock joint will be supported and stabilized during use by the horse. Although the interior patch 202 has been shown as only covering orthopedic pad 200, it should be understood that the interior patch 202 may extend over all or part of base portion 102.

Figure 6A:
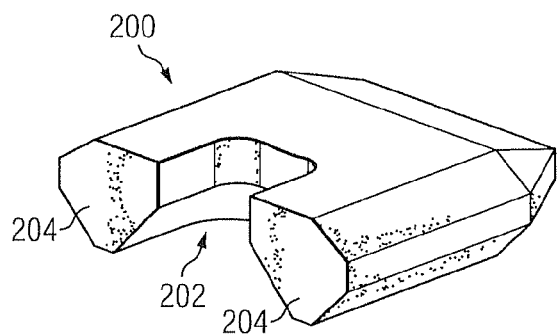
FIGS. 6A-6F are oblique and orthographic views of the orthopedic pad of the equine support boot of FIG. 1.
Figure 6B:
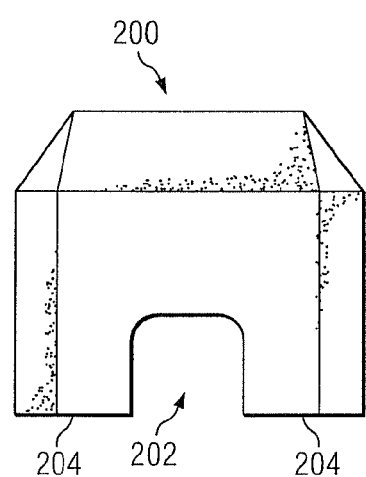
Figure 6C:
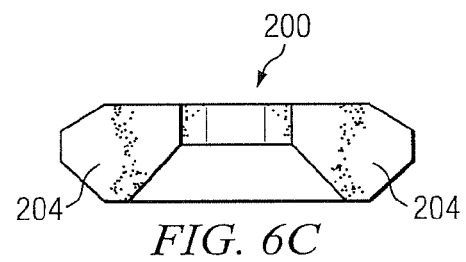
Figure 6D:
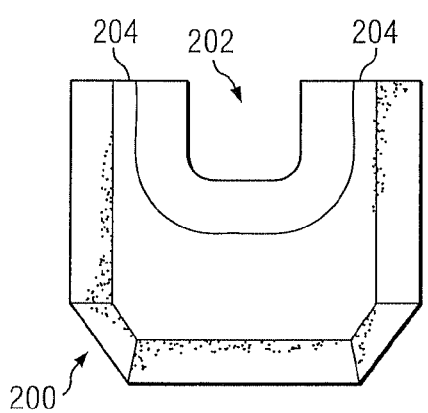
Figure 6E:
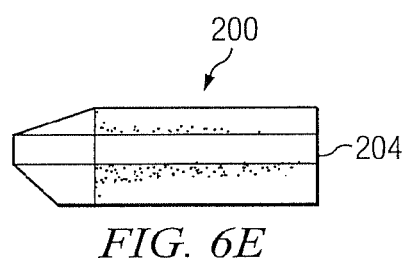
Figure 6F:
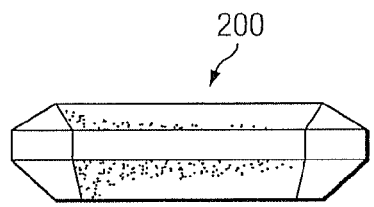
Figure 7A:
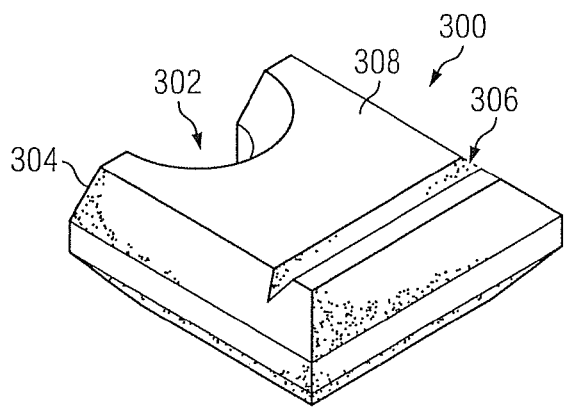
FIGS. 7A-7D are oblique and orthographic views of an alternate embodiment of the orthopedic pad of the equine support boot of FIG. 1.
Figure 7B:
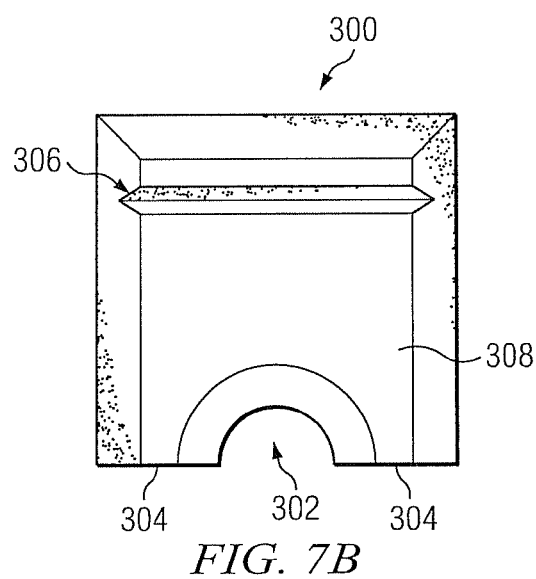
Figure 7C:
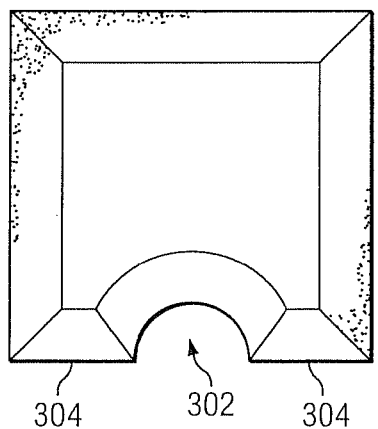
Figure 7D:
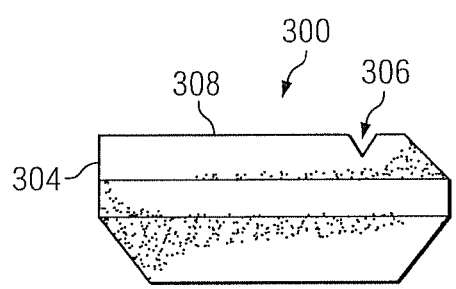

Various views of an example orthopedic pad 200 are shown in FIGS. 6A-6F. FIG. 6A is an oblique view; FIG. 6B is a top view; FIG. 6C is a front view; FIG. 6D is a bottom view; FIG. 6E is a left side view; and FIG. 6F is a rear view. As shown, the example orthopedic pad 200 has a generally rectangular shape with some or all of the edges being beveled or rounded. Also, the orthopedic pad 200 may also include a cut-out portion 202 centered along a bottom edge 204. Although the cut-out portion 202 is shown as being semicircular in shape, the cut-out portion 202 may have any shape and/or sizes. For example, the size and/or shape of the cut-out portion 202 may vary depending upon the use, application, and desired affect of support boot 100. According to some implementations, the orthopedic pad 200 may be formed from of an ethylene-vinyl acetate foam. This allows orthopedic pad 200 to be easily manufactured according to a wide variety of shapes, sizes, and other properties, and allows the performance characteristics of orthopedic pad 200 to be selectively chosen and tailored for particular applications. However, the orthopedic pad 200 is not so limited and may be formed from any desired material. For example, the material used to form the orthopedic pad 200 may be selected based on, among other things, the use, application, and desired affect of the support boot 100. For example, orthopedic pad 200 may be formed of the same material as base portion 102 and may be formed integrally with base portion 102.

FIGS. 7A-7D show various views of another example orthopedic pad 300. The orthopedic pad 300 is similar to the orthopedic pad 200, in that the orthopedic pad 300 includes a cut-out portion 302 disposed along a bottom edge 304. However, the orthopedic pad 300 includes an inwardly extending transverse groove 306 on an upper portion of an interior surface 308. The groove 306 allows the orthopedic pad 300 to bend and flex more easily. This feature allows the orthopedic pad 300 to be made of stiffer, more durable materials, without detracting from the performance of support boot 100.

Application of the support boot 100 to a horse's leg will now be described. First, the concave portion 110 and the orthopedic pad 200 are located adjacent to and just beneath the fetlock joint of the horse's leg. Then, the base portion 102 is wrapped snuggly around the horse's leg and secured in place by attaching the upper straps 108a, 108b, and 108c to the exterior surface of the loop fabric layer 120. In this step, it is preferred that the top edge 112 be aligned as the base portion 102 is wrapped around the horse's leg. In addition, in those embodiments in which the tendon support members 128a and 128b are employed, the base portion 102 is arranged such that the tendon support members 128a and 128b engage the tendon grooves of the horse's lower leg. Next, the first sling strap 104 is stretched underneath the concave portion 110 and the orthopedic pad 200, pulled around the horse's leg in an upward direction, and secured to the front of the base portion 102. In this step, it is preferred that the second connector portion 136 be located directly aligned with the concave portion 110 and the orthopedic pad 200. Then, the second sling strap 106 is stretched in the opposite direction underneath the concave portion 110 and the orthopedic pad 200, pulled around the horse's leg in an upward direction, crossed over the first sling strap 104, and secured to both the first receiver portion 134 and the front of base portion 102. In this step, it is preferred that the fourth connector portion 144 be aligned with the second connector portion 136. The crossover attachment and multiple connection points of the first sling strap 104 and the second sling strap 106, which is best seen in FIGS. 2 and 3, provides a very secure attachment of the support boot 100.

Once applied, the support boot 100 covers and protects areas proximal to the fetlock joint and provides support and stability to the horse's leg. The base portion 102 provides support, particularly lateral support, to the flexor tendons and suspensory ligament by decreasing any bowing of these structures during load-bearing. The support boot 100 also provides protection from blunt force injuries, such as over-reach, interference, run-down injuries, and others. The orthopedic pad 200 is secured snuggly between the palmar/plantar aspect of the proximal pastern and the ventral portion of the sesamoid bones, thereby restricting movement of the fetlock joint and providing load-bearing support to the bottom portion of the fetlock joint. This added support decreases the extension of the fetlock joint, thereby decreasing the tensile stress that can occur in the suspensory ligament and the flexor tendons during load-bearing. In addition, the orthopedic pad 200 cushions collisions between the horse's fetlock joint and the ground.

Figure 8:
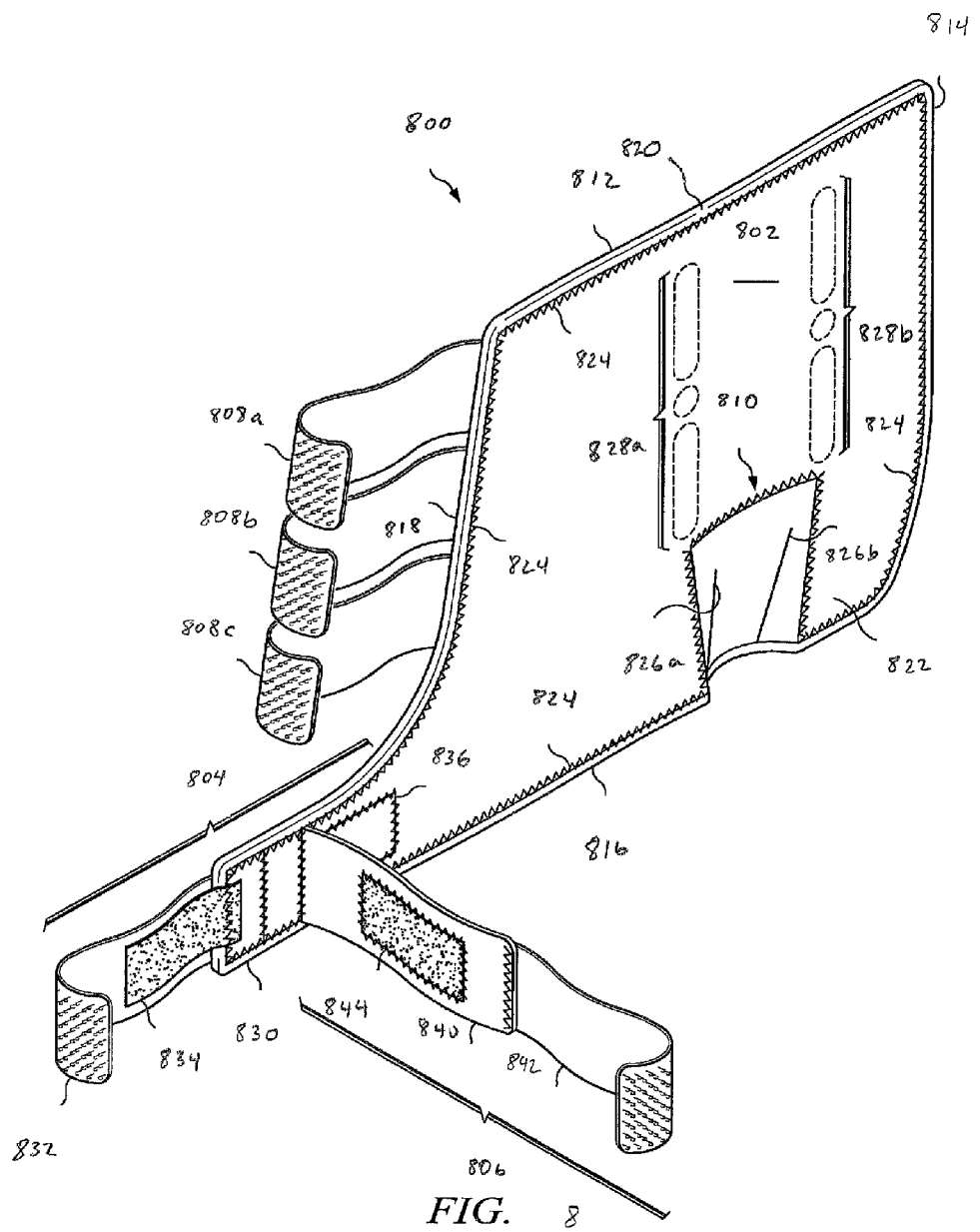
FIG. 8 is a perspective view of another example equine support boot.

While various implementations of the support boot 100 may include the orthopedic pad 200, other implementations of the support boot 100 may omit the orthopedic pad 200. For example, FIG. 8 shows an example support boot 800 that omits the orthopedic pad 200. The support boot 800 is similar to the support boot 100 shown in FIG. 1 and functions in a similar fashion. Additionally, the support boot 800 may be constructed in a similar manner as that described above with respect to the support boot 100. Accordingly, the support boot 800 may include a base portion 802, a first sling strap 804, a second sling strap 806, one or more upper straps 808a, 808b, and 808c, and a concave portion 810. The concave portion 810, however, does not include an orthopedic pad.

Further, the base portion 802 may include edges 812, 814, 816, 818 which may be similar to edges 112, 114, 116, and 118, described above. Also, the base portion 802 may have a construction similar to the base portion 102, such as by being formed from one or more layers of compliant materials. Thus, the base portion 802 may be formed from an inner neoprene layer 820 that is bonded on an exterior surface to an outer loop fabric layer 822. The loop fabric layer 822 may be formed from or include an unbroken loop fabric. Additionally, a thin knit fabric may be secured to the interior surface of neoprene layer 820. The thin knit fabric may be operable to protect and enhance the performance of neoprene layer 820. In some instance, the loop fabric layer 822 may form a loop portion of a hook and loop type bond between the first sling strap 804 and the base portion 802, and between the second sling strap 806 and the base portion 802, as previously explained with respect to the support boot 100.

Also similar to the support boot 100, the support boot 800 may constructed with stitching, such as stitching 824 along the edges 812, 814, 816, and 818. The upper straps 808a, 808b, and 808c may be adjustable so that the upper portion of support boot 800 can be snuggly and securely wrapped around the horse's lower leg above the fetlock joint. The concave portion 810 may be formed in or adjacent to bottom edge 816. In some instances, the concave portion 810 may be shaped by at least one pleat, such as pleats 826a and 826b, formed in base portion 802. The bottom edge 816 may curve upwardly adjacent concave portion 810, and may also curve upwardly near first sling strap 804 to aid in providing a snug fit around the horse's leg. As previously described, the base portion, such as the base portion 802 at the concave portion 810, may be coated, treated, or overlaid with a tough, durable material to prevent damage to the base portion 802. Thus, application of materials such as nylon, Kevlar, rubber, plastic, or others, may be used, for example, when the support boot 800 is adapted for use as a skid boot. As explained above, the addition of such materials to the concave portion 810 may be integral with the concave portion 810, may be bonded to the concave portion 810, or may be releasably coupled to the concave portion 810.

Also, similar to the support boot 100, the support boot 800 may include tendon support members 828a and 828b, which may function in a manner similar to the tendon support members 128a and 128b, described above. Additionally, the tendon support members 828a, 828b may be integral with and formed of the same material as base portion 802. In other instances, the tendon support members 828a and 828b may be formed of a different material, such as nylon, leather, rubber, plastic, or other suitable material. Further, the tendon support members 828a and 828b may be coated or treated with other compliant materials.

In some instances, the tendon support members 828a and 828b may be bonded to base portion 802 or secured into slots, pouches, or pockets in the base material 802. In other instances, the tendon support members 828a and 828b may be removably placed into slots, pouches, or pockets, permitting the selective use of the tendon support members on a case-by-case basis.

As shown in FIG. 8, the tendon support members 828a and 828b may form elongated ribs. Alternately, the tendon support members 828a and 828b may form circular buttons, oval ridges, and/or other shapes, either alone or in combination with each other. In addition, the tendon support members 828a and 828b may have custom configurations of shapes and materials that are selectively tailored for particular maladies, applications, or individual horses.

Also similar to the support boot 100, the second ling strap 106 may include a tab portion 840, a third connector portion 842, and a fourth connector portion 844. In some instances, the tab portion 840 may be formed from the same material as the base portion 802 and may be attached to the extension portion 830 of the first sling strap 804 by stitching. Alternately, the tab portion 840 may be formed from a material different than the base portion 802. The third connector portion 842 may be attached to the tab portion 840. For example, the third connector portion 842 may be attached to the tab portion 804 by stitching. The third connector portion 842 may be formed from hook-type fabric and function as a hook portion of a hook and loop type bond between the second sling strap 804 and the combination of the base portion 802 and the first receiver portion 834. In some implementations, the fourth connector portion 844 may be stitched or otherwise bonded to the interior surface of tab portion 840. The fourth connector portion 844 may be formed from hook-type fabric and function as a hook portion of a hook and loop type bond between second the sling strap 806 and the extension portion 830. In some instances, the fourth connector portion 844 may be aligned with the second connector portion 836 during installation of the support boot 800 onto the horse's leg.

Figure 11:
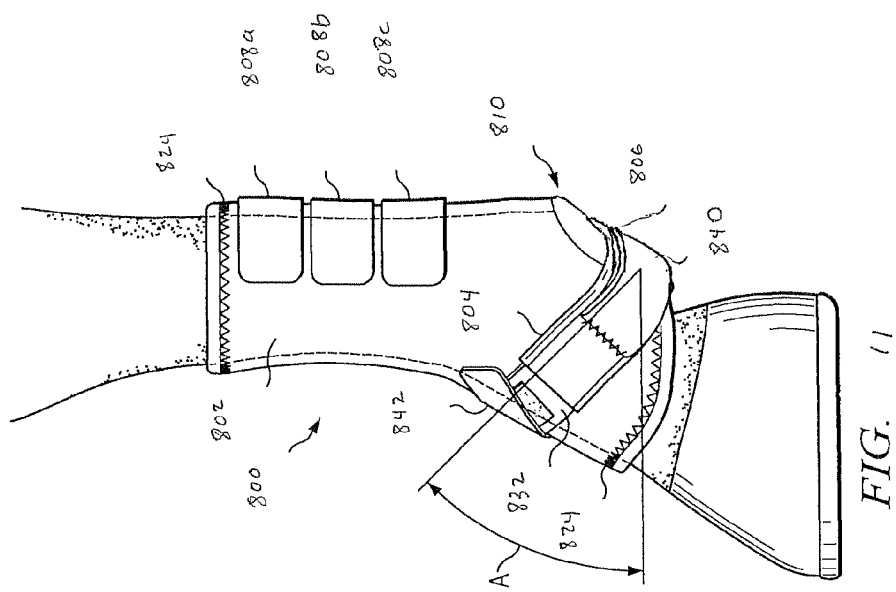
FIGS. 9-11 show various views of the equine support boot of FIG. 8 installed onto the lower leg of a horse.
Figure 10:
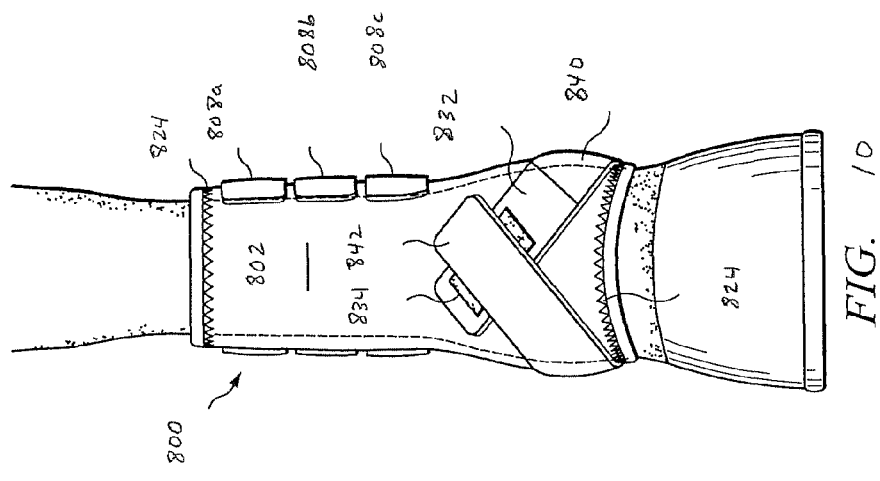
Figure 9:
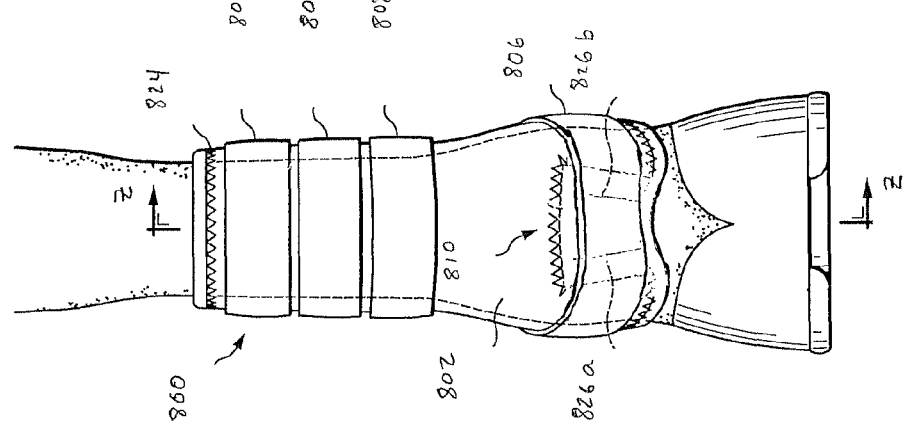

Similar to FIGS. 2-4, respectively, FIGS. 9-11 shows various views of the support boot 800 installed around the fetlock joint and lower leg of a horse. Accordingly, the support boot 800 extends from the proximal cannon bone to the distal pastern. Similar to the support boot 100, many of the components of the support boot 800 may be constructed from compliant materials that, when stretched and applied to a horse's lower leg, provide the support boot 800 with a strong and rigid support structure thereby providing support to the flexor tendons and suspensory ligament by decreasing the palmar/plantar movement, i.e., "bowing," of these structures during load-bearing. Further, the support boot 800 may provide protection from blunt force injuries, such as over-reach, interference, run-down injuries, and others. Such protection may be provided at least in part due to the compliant materials used to form one or more parts of the support boot 800. The protection may also be provided by the configuration and construction of the support boot 800.

As shown in FIG. 11 and similar to the support boot 100, when the support boot 800 is secured to a horse's leg, the first connector portion 832 of the first sling strap 804 and the tab portion 840 of the second sling strap 806 form an angle A with respect to concave portion 810. In some instances, the angle A may be 45°. In other instances, the angle A may be larger or smaller than 45°, depending, for example, on the application in which the support boot 800 is used.

Figure 12:
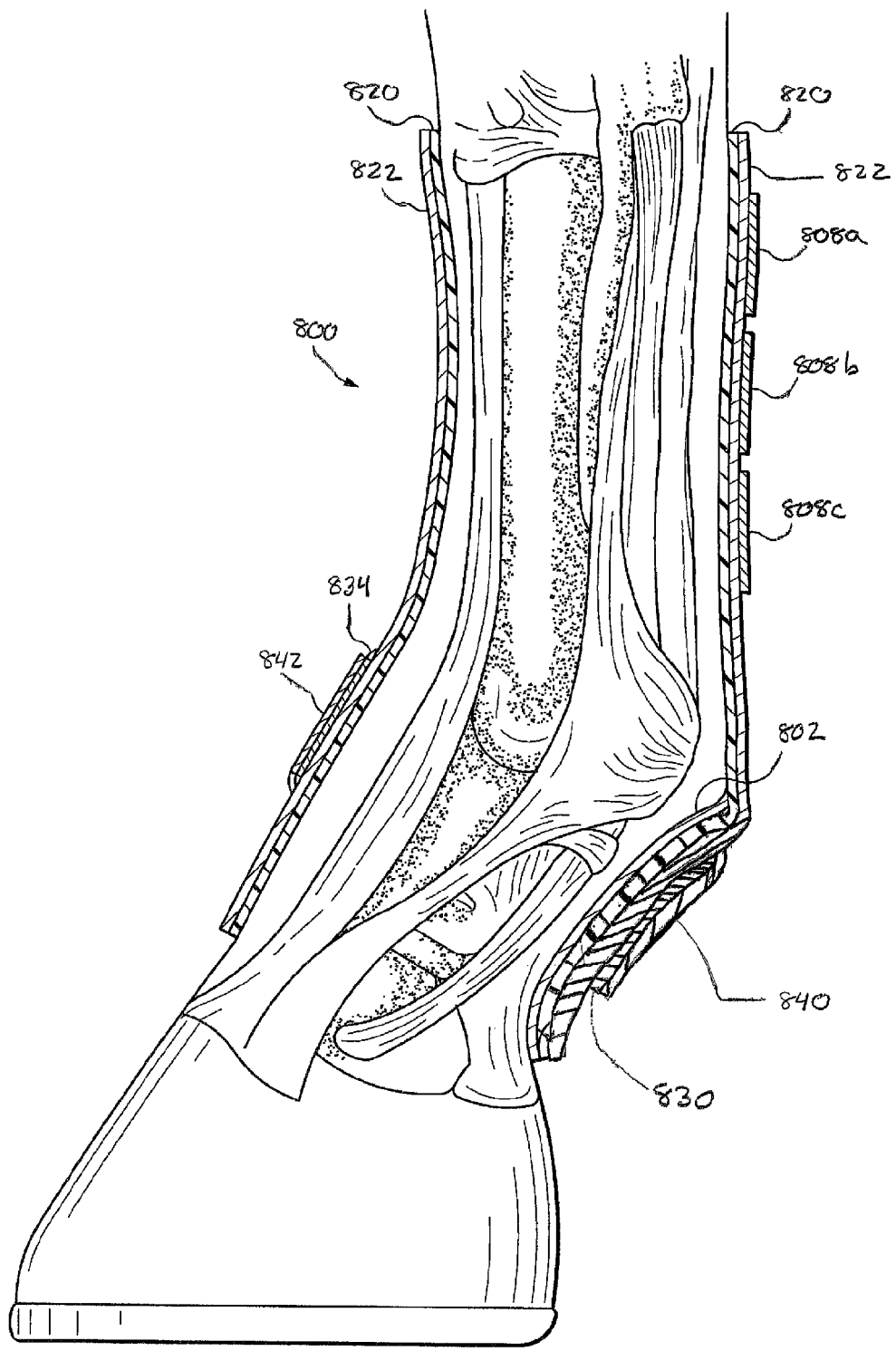
FIG. 12 is a longitudinal cross-sectional view of the equine support boot of FIG. 8 taken at Z-Z of FIG. 9 with a portion of the horse's lower leg included to illustrate the general alignment of the support boot.

FIG. 12, similar to FIG. 5, shows a cross-sectional view of the support boot 800 secured to a horse's leg. However, as mentioned above, the support boot 800 does not include an orthopedic pad, such as the orthopedic pad 200. Thus, concave portion 810, the first sling strap, and second sling strap 806 conform more closely to the form of the horse's fetlock joint. However, the support boot 800 maintains the ability to not only cover and protect the areas proximal to the fetlock joint but also to provide support to the flexor tendons and suspensory ligament by decreasing the palmar/plantar movement, i.e., "bowing," of these structures during load-bearing.

It will be appreciated that additional and/or other materials may be utilized to selectively tailor the strength, stiffness, and performance characteristics of support boots 100 and 800. For example, additional layers of fabric may be used to add strength. In addition, fabrics with specific directional characteristics, such as composite materials, may be used to selectively tailor the strength and stiffness of support boots 100 and 800 in particular directions. As an example, the knit material surrounding base portions 102 and 802 may be configured to be stronger and/or stiffer in the longitudinal direction than in the transverse direction. Such a configuration would allow compliance in the transverse direction, but restrict movement in the longitudinal direction.

It is apparent that the present disclosure describes a variety of support boots having significant benefits and advantages. The benefits and advantages of the support boots described herein, such as support boots 100 and 800, include: (1) transverse support of the fetlock joint; (2) upward support for the fetlock joint; (3) restriction of movement of the fetlock joint; (4) cushioning for collisions between the fetlock joint and the ground; and (5) an orthopedic pad that can be used in different types of equine boots, including support boots, skid boots, and splint boots.

The description of the support boot of the present disclosure, such as support boots 100 and 800, has been presented for purposes of illustration and description, and is not intended to be exhaustive or limited to the examples disclosed. Although the support boots 100 and 800 have been shown in a limited number of forms, the support boots 100 and 800 are not limited to just these forms, but is amenable to various changes and modifications without departing from the spirit thereof. Many modifications and variations will be apparent to those of ordinary skill in the art.

We claim:

1. An equine support boot, comprising:
    a base portion configured to wrap around a fetlock joint of a horse and provide varied levels of localized pressure to ligaments, tendons, and bones above and below the fetlock joint in a horse leg in order to prevent injury and provide therapeutic treatment;
    at least one upper strap configured to adjustably secure the base portion around the leg of the horse above the fetlock joint;
    a concave portion formed in the base portion adjacent to a bottom edge of the base portion, the concave portion being configured to engage the fetlock joint;
    a first sling strap configured to stretch underneath the concave portion and secure to a front portion of the horse leg, the first sling strap being formed as an elongated extension of the base portion wrapping around an exterior surface of the base portion below the concave portion to apply a selectively adjustable upward force against the pad below the fetlock joint, thus decreasing a tensile stress in the localized area between a palmer/planter aspect of a proximal pastern and a ventral portion of the proximal sesamoid bone; and
    a second sling strap configured to overlap the first sling strap below the fetlock joint and provide an upward force on the concave portion, the second sling strap having:
        a first end fixedly attached to the first sling strap;
        a second end configured to releasably attach to the base portion; and
        a first connector portion between the first end and the second end being configured to releasably attach the second sling strap to the first sling strap below the fetlock joint.

2. The equine support boot according to claim 1, wherein the first sling strap and the second sling strap form an angle relative to the concave portion of about 45°.

3. The equine support boot according to claim 1, wherein the base portion is formed from a plurality of layers.

4. The equine support boot according to claim 1, wherein the base portion comprises:
    at least one internal layer of neoprene; and an exterior loop fabric layer adapted to releasably receive the at least one upper strap and at least one of the first sling strap and the second sling strap as hook and loop type bonds.

5. The equine support boot according to claim 1, further comprising:
   at least one protruding tendon support member carried by the base portion.

6. The equine support boot of claim 5, wherein the at least one tendon support member extends longitudinally along a portion of the base portion.

7. The equine support boot of claim 6, wherein the tendon support members extend inwardly from the base portion and are adapted to engage tendon grooves of a horse's lower leg.

8. The equine support boot of claim 6, wherein the at least one tendon support member comprise at least one of a continuous slender member, a circular button, and an oval ridges.

9. The equine support boot of claim 5, wherein the at least one tendon support member is removable.

10. The equine support boot of claim 1, wherein the first sling strap, and the second sling strap are secured with hook and loop fasteners.

11. The equine support boot of claim 1, wherein the first sling comprises a second connector portion that engages the concave portion to secure at least a portion of the first sling to the concave portion.

12. The equine support boot of claim 11, wherein the first connector portion and the second connector portion form a hook and loop type bond.

* * * * *